United States Patent [19]
Wakabayashi et al.

[11] 3,719,933
[45] March 6, 1973

[54] MEMORY DEVICE HAVING LEAD DIOXIDE PARTICLES THEREIN

[75] Inventors: Takashi Wakabayashi; Terukazu Kinugasa; Shiro Hozumi; Kanji Sugihara, all of Osaka, Japan

[73] Assignee: Matsushita Electric Industrial Co., Ltd., Osaka, Japan

[22] Filed: March 29, 1971

[21] Appl. No.: 128,671

[30] Foreign Application Priority Data

Apr. 20, 1970 Japan ........................ 45/28410

[52] U.S. Cl. ......340/173 TP, 317/234 V, 340/173 R
[51] Int. Cl. ..........G11c 11/46, H01l 3/00, H01l 9/00
[58] Field of Search.......338/20; 317/234 V, 234, 28; 340/173 CH, 173 TP

[56] References Cited

UNITED STATES PATENTS

| | | | |
|---|---|---|---|
| 3,271,591 | 9/1966 | Ovshinsky | 317/234 V |
| 3,564,353 | 2/1971 | Corak et al. | 338/20 |
| 3,611,073 | 10/1971 | Hamamoto | 338/20 |
| 3,486,156 | 12/1969 | Welch | 340/173 R |

*Primary Examiner*—Stanley M. Urynowicz, Jr.
*Attorney*—Wenderoth, Lind & Ponack

[57] ABSTRACT

A memory device for memorizing an electric signal. Said memory device has an organic resin film having lead dioxide particles dispersed therein, a positive electrode, and a negative electrode. The memory device has a high electrical resistance state and a low electrical resistance state. An applied electric signal at a critical voltage and with forward polarity can transform the memory device from the high electrical resistance state to the low electrical resistance state. An applied electric erasing signal at a pre-determined voltage with reverse polarity can return the memory device from the low electrical resistance state to the high electrical resistance state.

11 Claims, 4 Drawing Figures

INVENTORS
TAKAHASHI WAKABAYASHI
TERUKAZU KINUGASA
SHIRO HOZUMI
KANJI SUGIHARA

BY Wenderoth, Lind & Ponack
ATTORNEYS

MEMORY DEVICE HAVING LEAD DIOXIDE PARTICLES THEREIN

This invention relates to a memory device for memorizing an electric signal and deals particularly with a memory device comprising an organic resin film having lead oxide particles dispersed therein.

Various conductive materials are known which have conductive particles dispersed in organic resin. These conductive materials have been developed for use in conventional ohmic resistors or electrically conductive connectors between electric components.

There is no disclosure in the prior art of the possibility of making a memory device from organic resin having conductive particles dispersed therein. The prior art dealing with memory devices which have a high resistance state and a low resistance state discloses crystalline based negative resistance devices. It is difficult to form these existing memory devices into a film-type body.

Upon superposition of an electric signal on a biasing voltage, these existing memory devices can be transformed from a high resistance state to a low resistance state. When said biasing voltage is removed, said resistance state returns from the low to the high resistance state. It is desirable for such a memory device that the resistance state remain at the low resistance state for a long time even in the absence of said biasing voltage.

An object of this invention is to provide a memory device which has an organic resin film having finely divided lead dioxide particles dispersed therein.

A further object of this invention is to provide a memory device which memorizes an electric signal for a long time even in the absence of an electric field.

These and other objects are achieved by providing a memory device which comprises an organic resin film having lead dioxide particles dispersed therein, and a positive electrode and a negative electrode applied to opposite surfaces of said organic resin film, and which device has a high resistance state and a low resistance state. The process of memorizing an electric signal by the use of such a memory device comprises supplying an electric signal at a critical voltage across the positive electrode and the negative electrode with forward polarity while the memory device is in the high resistance state, whereby said high resistance state is transformed into the low resistance state, and supplying an erasing signal at a pre-determined voltage across said positive electrode and said negative electrode with reverse polarity while said memory device is in said low resistance state, whereby said low resistance state is returned to said high resistance state.

These and other features of this invention will be apparent from the following detailed description taken together with the accompanying drawings, wherein.

Figure 1:
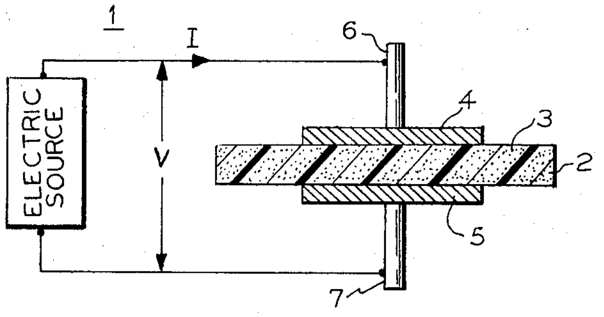
FIG. 1 is a cross-sectional view of an embodiment of a memory device according to this invention.

The construction of a memory device contemplated by this invention will be explained with reference to FIGS. 1 and 2. An organic resin film 2 has lead dioxide particles 3 dispersed therein. A positive electrode 4 and a negative electrode 5 are conductively attached to the respective opposite surfaces of said organic resin film 2, . A terminal lead 6 and a terminal lead 7 are connected to said positive electrode 4 and said negative electrode 5, respectively, by any available and suitable method.

Figure 4:
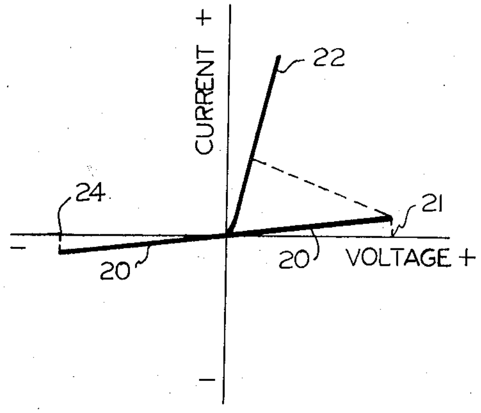
FIG. 4 is a graph illustrating an exemplary voltage-current characteristic of a memory device according to this invention.

The memory device 1 according to this invention has two electric conduction states or two resistance states, a high resistance state and a low resistance state, which are dependent upon the voltage and its polarity applied across said positive electrode 4 and said negative electrode 5, as shown in FIG. 4. When a voltage V (FIGS. 1 and 2) is applied with forward polarity across the memory device 1 when it is in a high resistance state as indicated by a curve 20 increases up to a critical voltage 21, the conduction state of said memory device 1 is transformed quickly from the high resistance state as indicated by the curve 20 to the low resistance state 22. After the transformation into the low resistance state 22, an increase in the voltage V causes a high current I (FIGS. 1 and 2) to flow almost linearly from said positive electrode 4 to said negative electrode 5. In said low resistance state 22, a decrease in the voltage V results in a decrease in the current I continuously down to zero. Said low resistance state 22 is maintained even during repeated cycles of increasing and decreasing voltage V having a forward polarity across said memory device 1, and this low resistance state is retained for a long period even in the absence of the voltage V. Said low resistance state 22 can be transformed into the high resistance state 20 by applying a voltage having a reverse polarity at a level approximately equal to the critical voltage 21 across the positive electrode 4 and the negative electrode 5. Upon the application of the voltage V with reverse polarity across said memory device 1, said low resistance state 22 is spontaneously transformed into the high resistance state 20. After an increase in the voltage V with reverse polarity up to the erasing voltage 24 approximately equal to the critical voltage 21, a decrease in the voltage V results in an almost linear decrease down to zero in the current I flowing from the negative electrode 5 to the positive electrode 4. Then, an increase with the voltage V in forward polarity results in a small increase in the current I along the curve indicating the high resistance state 20 as shown in FIG. 4. The high resistance state 20 is maintained even during repeated cycles of increasing voltage V up to a voltage slightly below the critical voltage 21 and decreasing voltage V down to the erasing voltage 24. The high resistance state 20 can be retained permanently even in the absence of an applied voltage across the memory device 1.

The memory device 1 according to this invention can be operated by a combination of electric pulses. When a voltage pulse which has a higher level than the critical voltage 21 and which has a width ranging from $10^{-6}$ to $10^{-3}$ second is applied with forward polarity across the memory device 1 when it is in the high resistance state 20, the memory device 1 is transformed from the high resistance state 20 to the low resistance state 22. When a voltage pulse which is equal to the erasing voltage 24 and which has a width ranging from $10^{-6}$ to $10^{-3}$ second is applied reverse polarity across the memory device 1 when it is in the low resistance state 22, the memory device 1 can be transformed from the low resistance state 22 to the high resistance state 20.

Figure 2:
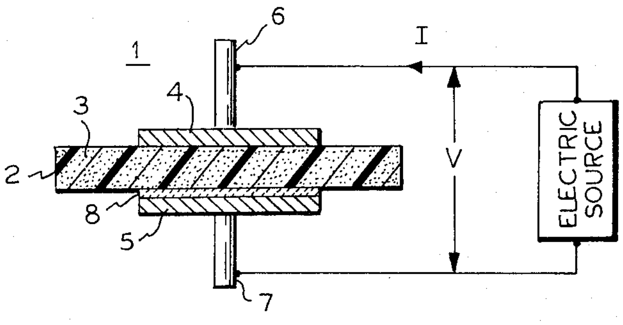
FIG. 2 is a cross-sectional view of another embodiment of a memory device according to this invention.
Figure 3:
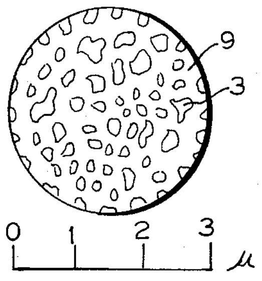
FIG. 3 is an enlarged view of a partial cross-section of an organic resin film according to this invention, which has lead dioxide particles dispersed therein.

With reference to FIGS. 1 and 3, a description will be given of the organic resin film 2 which comprises the resin 9 having finely divided lead dioxide particles 3 dispersed therein (FIG. 3).

Any suitable and available resin can be used. Operable resins are thermo-setting resins and thermo-plastic resins such as; phenol-formaldehyde, xylene-formaldehyde, urea-formaldehyde, polymides, polyurethane, polysulfide, polyethylene, polystyrene, polycarbonate, polyacetal, polyamide, polyphenylene oxide, phenoxy, silicon, polyvinyl halide such as polyvinyl chloride, polyvinylidene chloride, and chlorinated rubber.

If necessary, the resin can be admixed with a low molecular weight substance such as a surface active agent and a plasticizer.

Among these resins, a halogen containing resin such as a chlorinated natural rubber produces the best results with respect to the stability of the memory device 1 during repeated cycles of transforming said memory device 1 between the two states.

The finely divided lead dioxide particles 3 preferably have an average particle size of 0.1 micron to 5 microns. The critical voltage 21 and the resistance in the low resistance state 22 become unstable during repeated cycles when the average particle size is less than 0.1 micron. On the contrary, when the average particle size is more than 5 microns the resultant critical voltage 21 deviates widely from the desired voltage. The average particle size is determined by sedimentation analysis and electron microscopy.

Referring to FIG. 3, the distance between individual particle 3 has an effect on the transformation from the high resistance state 20 to the low resistance state 22 (FIG. 4) of the memory device 1 according to this invention. Lead dioxide particles 3 which are in contact with each other make no contribution to such a transformation. When the average inter-particle distance increases, the organic resin film 2 (FIGS. 1 and 2) has a higher electrical resistivity. An electron microscopic observation indicates that an average distance of 500 to 5,000A is operable for accomplishing said transformation from the high resistance state 20 to the low resistance state 22, and vice versa, and for achieving a long retaining time for said low resistance state 22.

The distance is dependent upon the average particle size and the percentage of the volume of the film occupied by the particles relative to the resin. For example, when the lead dioxide particles 3 having an average particle size of 1.0 micron are dispersed in a resin 9, and the lead oxide particles occupy 22 to 63 percent of the volume of the film relative to the resin, the average inter-particle distance will be 500 to 5,000A. In the calculation, the specific gravities of the lead dioxide particles 3 and the resin 9 are taken to be 9.4 and 1.2, respectively.

The organic resin film 2 (FIG. 1) preferably has an thickness of 5 to 500 microns. When said thickness is less than 5 microns, the critical voltage 21 and the low resistance state 22 become unstable during repeated cycles of the memorizing and the erasing process even when a constant erasing voltage 24 is used. On the contrary, when said thickness is greater than 500 microns, the resultant memory device 1 cannot be transformed into the low resistance state 22.

Materials used in the positive electrode 4 and the negative electrode 5 have an effect on the operation of the memory device 1 according to this invention.

A preferred material for the positive electrode 4 is one member selected from the group consisting of; gold (Au), silver (Ag), copper (Cu), carbon black or graphite (C), lead dioxide ($PbO_2$), stannic oxide ($SnO_2$), and cadmium oxide (CdO).

A preferred material for the negative electrode 5 is one member selected from the group consisting of; aluminum (Al,), titanium (Ti), tantalum (Ta), and zinc (Zn).

It has been discovered according to this invention that a negative electrode 5 having a metal oxide layer in contact with an organic resin film 2 increases the breakdown voltage with reverse polarity. Referring to FIG. 2, a negative electrode 5 has an oxide layer 8 formed on the surface thereof, which is in contact with an organic resin film 2. The larger the thickness of said oxide layer 8 the higher the breakdown voltage. The preferable thickness is less than 1000A. When the thickness is more than 1000A, the resultant memory device 1 cannot be transformed into the low resistance state 22. The oxide layer 8 on the metal of the negative electrode 5 can be formed by any suitable and available method such as anodizing in an electrolyte and/or oxidation in an oxygen atmosphere.

Among those electrode materials described above, a combination of silver as the positive electrode 4 and aluminum as the negative electrode 5 produces the best results on in the operation of the memory device 1 according to this invention.

The memory device 1 according to this invention can be prepared by any available and suitable means. A given amount of a resin is dissolved in any suitable solvent. The amount of solvent is chosen so that the resultant solution will have a viscosity of about 10 poises. Finely divided lead dioxide particles in a desired amount are added to the solution. The amount of finely divided lead dioxide particles is determined according to the desired volume percentage relative to the resin. The mixture is mixed well by any suitable and available means, for example a ball mill, to produce a homogeneous paint having said finely divided lead dioxide particles dispersed uniformly in the solution. The homogeneous paint is applied to any suitable substratum acting as the positive electrode 4 and/or the negative electrode 5. If necessary, the substratum is oxidized at one surface by any suitable method. The homogeneous paint applied to the substratum is heated to evaporate the solvent. The resin included in said homogeneous paint is cured and hardened to form the organic resin film 2. Another electrode is formed on the organic resin film 2 by any suitable and available means such as a vacuum deposition of a metal and/or an application of a conductive paint having finely divided electrode material particles dispersed therein.

Another method for preparing the memory device 1 according to this invention is to heat the homogeneous paint for evaporating the solvent. The heated homogeneous paint is a viscous homogeneous mixture of the finely divided lead dioxide particles and resin. Such a viscous homogeneous mixture is treated to form a film according to well known plastic film forming technology. The film is provided with the positive and the negative electrodes 4 and 5 on the respective opposite surfaces by any suitable means such as a vacuum deposition of an electrode material and/or the application of a conductive paint having finely divided electrode material particles dispersed therein.

Example 1

This example relates to a series of devices having various weight % of lead dioxide particles of a given particle size. One weight portion of chlorinated natural rubber having 60 weight percent chlorine incorporated therein is dissolved in 10 weight portions of ortho-dichloro-benzene. The lead dioxide particles having an average particle size of 0.5 micron are dispersed uniformly in the solution to form a homogeneous paint. The weight percentages of lead dioxide particles with respect to the resin are adjusted to be of 35 to 70 percent, respectively. The homogeneous paint is applied to a metal aluminum substratum acting as the negative electrode, and is heated at 160°C for an hour to form an organic resin film having a thickness of about 30 microns. The film is provided with the positive electrode by vacuum depositing silver. The area of the positive electrode and that of the negative electrode are almost same being about 0.75 $mm^2$. Two terminal leads are connected to the two electrodes, respectively, by a conventional conductive adhesive.

When lead dioxide particles are present in an amount more than 70 weight percent, the device acts as does not achieve the transformation. A use of lead dioxide particles less than 35 weight percent forms an insulating body having a high resistance similar to that of the chlorinated natural rubber. When lead dioxide particles are present in an amount of 35 to 70 weight percent the device acts as a memory device which has the high resistance state and the low resistance state in accordance with the present invention. Table 1 shows the electrical properties of the memory devices formed as described above.

TABLE 1

| Weight Percentage of Lead Dioxide Particle | Critical Voltage (volt) | Electrical Resistance of Low State (Ω) |
|---|---|---|
| 35 | 60 | $4 \times 10^5$ |
| 40 | 30 | $1.5 \times 10^5$ |
| 55 | 8 | $8 \times 10^4$ |
| 70 | 3 | $1 \times 10^4$ |

These memory devices have electric resistances higher than $10^9$ ohms in their high resistance states. These memory devices retain the low resistance states for periods more than few hours in absence of the applied voltage at room temperature. Each of said low resistance states is transformed into the respective high resistance state upon the application of a voltage pulse which at its maximum is equal in value to the respective critical voltage and which has a width of $10^{-5}$ second which has reverse polarity.

Example 2

Lead dioxide particles having various average particle sizes are used for various memory devices as shown in Table 2. The weight percents of these lead dioxide particles is varied with the particle size as shown in Table 2. A homogeneous paints and memory devices are prepared in a manner similar to the Example 1.

TABLE 2

| | | | | |
|---|---|---|---|---|
| Average Particle Size (μ) | 0.2 | 0.5 | 1.0 | 5 |
| Weight (%) | 38 | 45 | 57 | 80 |
| Critical Volt. (v) | 20 | 10 | 15 | 6 |
| Electrical Resistance (Ω) Low | $3 \times 10^5$ | $5 \times 10^4$ | $1.5 \times 10^5$ | $1.3 \times 10^3$ |
| Electrical Resistance (Ω) High | $2 \times 10^{10}$ | $5 \times 10^{10}$ | $3 \times 10^{10}$ | $8 \times 10^{10}$ |

The electrical properties of these memory devices are as shown in Tables 2.

Example 3

This example relates to a series of the memory devices having various materials for the positive and the negative electrodes as shown in Table 3. A homogeneous paint is prepared by dispersing 45 weight percent of lead dioxide particles having an average particle size of 0.5 micron into 55 weight percent of chlorinated natural rubber used in Example 1 in a manner similar to that of Example 1. The homogeneous paint is applied to a negative electrode and heated in a similar manner to Example 1. The memory devices having various kinds of electrodes have organic resin films of almost the same thickness and have electrodes with the same area as the electrodes of the example 1, respectively. The positive electrodes of the memory devices Nos. 1 to 5 are prepared by vacuum deposition methods. The positive electrodes of the memory devices Nos. 7 to 9 are prepared by applying conductive inks. These conductive inks are fabricated in the following way; finely divided electrode materials having an average particle size of about 0.2 microns are dispersed into chlorinated natural rubber dissolved in toluene. In all cases, 90 percent by volume of the finely divided electrode material is dispersed in 10 percent by volume of the chlorinated natural rubber. The negative electrode of device No. 6 has an aluminum oxide layer with a thickness of about 100A formed on the surface thereof. Said aluminum oxide layer is formed by anodization of aluminum metal in an ammonium borate solution. The electrical properties of those resultant memory devices are as shown in Table 3.

TABLE 3

| No. | Electrode + | Electrode − | Critical Voltage (volt) | Electrical Resistance (Ω) Low State | Electrical Resistance (Ω) High State |
|---|---|---|---|---|---|
| 1 | Ag | Al | 8 | $3 \times 10^4$ | $5 \times 10^{10}$ |
| 2 | Ag | Ti | 6 | $3.5 \times 10^4$ | $3 \times 10^{10}$ |
| 3 | Ag | Ta | 5 | $4 \times 10^4$ | $3 \times 10^{10}$ |
| 4 | Ag | Zn | 6 | $1 \times 10^5$ | $6 \times 10^{10}$ |
| 5 | Ag | $Al_2O_3$-Al | 10 | $6 \times 10^4$ | $1 \times 10^{11}$ |
| 6 | Au | Al | 4 | $1 \times 10^4$ | $5 \times 10^{10}$ |
| 7 | Graphite | Al | 3 | $6 \times 10^4$ | $6 \times 10^{10}$ |
| 8 | $PbO_2$ | | 15 | $5 \times 10^5$ | $4 \times 10^{10}$ |
| 9 | CdO | Al | 4 | $2 \times 10^4$ | $3 \times 10^{10}$ |

Example 4

A homogeneous paint is prepared by dispersing 45 weight percent of lead dioxide particles having an average particle size of 0.5 micron in 55 weight percent of resins as listed in Table 4. The different resins are dissolved in different solvents as shown in Table 4. The memory devices including such resins are prepared in a manner similar to that of Example 1. The electrical properties of the resultant memory devices are as presented in Table 4.

TABLE 4

| Resin | Solvent | Critical Voltage (volt) | Electrical Resistance Low State (Ω) |
|---|---|---|---|
| Polyimde | N-methyl-2 Pyrrolidone | 15 | $5\times10^5$ |
| Urea-formal -dehyde | methylalcohol | 7 | $3\times10^4$ |
| Polystyrene | toluene | 5 | $2\times10^4$ |
| Polyvinyl-chloride | toluene | 10 | $5\times10^4$ |
| Polystyrene 75 w% Chlorinated Paraf -fin ($C_{24}H_{29}Cl_{21}$) 25 w% | O-dichloro- benzene | 3 | $1.5\times10^4$ |

What is claimed is:

1. A memory device comprising an organic resin film having lead dioxide particles dispersed therein, and a positive electrode and a negative electrode applied to the respective opposite surfaces of said organic resin film.

2. A memory device as claimed in claim 1, wherein said lead dioxide particles have an average particle size of 0.1 micron to 5 microns.

3. A memory device as claimed in claim 1, wherein said lead dioxide particles are dispersed in said organic resin film at an average spacing of 500 to 5,000A.

4. A memory device as claimed in claim 1, wherein said positive electrode consists essentially of one member selected from the group consisting of gold, silver, copper, carbon black or graphite, stannic oxide, cadmium oxide, and lead dioxide.

5. A memory device as claimed in claim 5, wherein said negative electrode consists essentially of one metal selected from the group consisting of aluminum, titanium, tantalum, and zinc.

6. A memory device as claimed in claim 5, wherein said negative electrode has an oxide layer in contact with said organic resin film.

7. A memory device as claimed in claim 1, wherein said organic resin film has a thickness of 5 microns to 500 microns.

8. A memory device as claimed in claim 1, wherein said organic resin consists essentially of a thermosetting resin.

9. A memory device as claimed in claim 1, wherein said organic resin consists essentially of a thermoplastic resin.

10. A memory device as claimed in claim 9, wherein said organic resin consists of a chlorinated rubber.

11. A memory device as claimed in claim 1, wherein said positive electrode and said negative electrode consist of silver and aluminum, respectively.

* * * * *